United States Patent [19]

Abe et al.

[11] Patent Number: 4,703,019
[45] Date of Patent: Oct. 27, 1987

[54] GLASS USEFUL AS EITHER PHOTOSENSITIVE GLASS OR OPALINE FOAM GLASS

[75] Inventors: Yoshihiro Abe; Hideo Hosono, both of Aichi, Japan

[73] Assignee: Central Glass Company, Limited, Ube, Japan; a part interest

[21] Appl. No.: 861,269

[22] Filed: May 9, 1986

[30] Foreign Application Priority Data

May 20, 1985 [JP] Japan ............................... 60-105973

[51] Int. Cl.$^4$ ........................... C03C 4/02; C03C 4/04
[52] U.S. Cl. ........................................ 501/13; 501/42; 501/45; 501/48; 501/49; 501/73; 501/77
[58] Field of Search ....................... 501/13, 42, 45, 48, 501/49, 73, 77

[56] References Cited

FOREIGN PATENT DOCUMENTS 1385645 2/1975 United Kingdom .
1411766 10/1975 United Kingdom .
1428880 3/1976 United Kingdom .

OTHER PUBLICATIONS

G. Whichard and D. E. Day; "Glass Formation and Properties in the Gallia-Calcia System; Journal of Non-Crystalline Solids; 66, (1984); pp. 477–487.

J. E. Shelby; "Formation and Properties of Calcium Aluminosilicate Glasses"; Journal of American Ceramic Society; 68, (1985); pp. 155–158.

Primary Examiner—Ferris H. Lander
Attorney, Agent, or Firm—Fleit, Jacobson, Cohn & Price

[57] ABSTRACT

The invention relates to a photosensitive and heat-sensitive glass which is composed of 25–70 mol % of $Al_2O_3$ and/or $Ga_2O_3$, 30–75 mol % of at least one of CaO, BaO, SrO and MgO and 0–40 mol % of an auxiliary component which is at least one of $SiO_2$, $GeO_2$, $B_2O_3$ and $P_2O_5$. The glass is produced by melting a batch mixture of powdery raw materials. By exposure to UV rays the glass colors in yellowish brown, and the color does not fade by termination of the exposure. Bleaching of the colored glass is accomplished by heating for a short time at about 150°–300° C. Coloration and bleaching can be repeated without deterioration. The same glass turns into an opaline foam glass, which presents a very attractive appearance, by heat treatment at a temperature above the softening temperature. This change is irreversible. The foams created in the glass matrix are usually tens of microns in diameter.

10 Claims, 3 Drawing Figures

GLASS USEFUL AS EITHER PHOTOSENSITIVE GLASS OR OPALINE FOAM GLASS

BACKGROUND OF THE INVENTION

This invention relates to a photosensitive glass which colors by exposure to ultraviolet rays and undergoes thermal bleaching, and which turns into an opaline foam glass by heat treatment at a temperature above the softening temperature.

A typical example of known photosensitive glasses is the so-called photochromic glass which is obtained by precipitation of fine particles of a noble metal or heavy metal halide in the matrix of a borosilicate glass. The manufacture of this photochromic glass requires advanced and sophisticated techniques and very troublesome operations and entails high costs. Another reason to limit application of this photochromic glass is that it is very difficult to produce wide sheets of this glass.

Another example of known means to obtain a photosensitive glass is doping of a silicate glass with a rare earth element. However, this method is hardly put into practical use because of significant fatigue and deterioration of the obtained photosensitive glass.

There are some proposals for photosensitive glasses using neither noble metals nor rare earth elements. For example, Japanese patent application primary publication No. 58-204839 (1983) shows a UV-sensitive glass which is composed essentially of $SiO_2$, alkali metal oxide(s) and alkaline earth metal oxide(s) and may optionally include $Al_2O_3$ and/or $B_2O_3$. However, this photosensitive glass is not very suitable for practical use because both the rate of coloration by exposure to UV rays and the intensity of coloration are too low.

Changing the topic, there are various types of translucent or opaline glasses having the effect of scattering light. The most popular and primitive one is frosted glass produced by grinding one side of sheet glass. Frosted glass is inexpensive and is effective in preventing seethrough, but it lacks elegance from an aesthetic or ornamental point of view and has a disadvantage that the light scattering effect is lost, for example, by condensation of moisture on the ground glass surface. Also it is well known to produce a so-called milky glass or opal glass by adding an opacifying agent such as a phosphate or a fluoride to a silicate glass. In practice, however, it is not so easy to very uniformly disperse the opacifying agent to thereby surely prevent irregularity in opacification. Therefore, the production requires special facilities including stirring means provided to the melting apparatus, so that the cost of production is not satisfactorily low.

Japanese patent application primary publication No. 49-90709 (1974) shows an opaline glass not containing any opacifying agent. Essentially this glass is composed of $SiO_2$, $Al_2O_3$, CaO and MgO, and opalization is accomplished by performing melting of the batch mixture at a specific temperature so as to cause phase separation, lowering the temperature of the melt to a specific level at the stage of forming the glass into a sheet or otherwise and cooling the formed glass at a specified cooling rate. Although this opaline glass is low in the material costs, the manufacturing operations require complicated techniques for precisely controlling the temperatures and the cooling rate.

SUMMARY OF THE INVENTION

It is an object of the present invention to provide a photosensitive glass which is low in production cost and can easily, rapidly and deeply be colored by irradiation with ultraviolet rays.

It is another object of the invention to provide an opaline foam glass which is low in production cost and has an attractive appearance.

In one aspect, the present invention provides a photosensitive glass, which consists essentially of 25-70 mol % of a first component which is at least one metal oxide selected from $Al_2O_3$ and $Ga_2O_3$, 30-75 mol % of a second component which is at least one alkaline earth metal oxide selected from CaO, BaO, SrO and MgO and 0-40 mol % of an auxiliary component which is at least one oxide selected from $SiO_2$, $GeO_2$, $B_2O_3$ and $P_2O_5$, and which colors by irradiation with ultraviolet rays and resumes a colorless state by adequate heating after coloration.

As will be understood from the above indicated glass composition a photosensitive glass according to the invention is produced from inexpensive raw materials without need for any dopant. By irradiation with ultraviolent rays longer than about 350 nm in wavelength this glass rapidly becomes yellowish brown in color, and very deep coloration is possible. By using a mask of a desired pattern it is possible to produce a clear and high-contrast ratio image. The yellowish brown color does not fade by termination of irradiation with UV rays, but bleaching of the colored glass can easily be accomplished by heating at about 150°-300° C. for a very short time. The coloration and bleaching can be repeated many times without causing deterioration of the photosensitive property of the glass. Therefore, a photosensitive glass according to the invention is very suitable for optical memories.

In another aspect, this invention provides an opaline foam glass, which is similar in glass composition to the above described photosensitive glass and comprises minute foams created in the glass matrix by heat treatment of the glass at a temperature above the softening temperature of the glass.

An opaline foam glass according to the invention is produced from inexpensive raw materials by simple techniques. This opaline glass has fine foams, which are usually tens of microns in diameter, and gives the appearance of a fine-grained surface that is soft to the touch though actually the glass has smooth surfaces. The fine foams and milk-white color give splendid and elegant impressions. Besides, this foam glass has a heat insulating capability because of fineness of the foams and denseness of distribution of the foams. Therefore, an opaline foam glass according to the invention is useful as a building material, and particularly as a wall decorating material, or as an illuminating material.

Some glass compositions not containing alkali metal oxides and resembling the compositions specified in this invention are used for special purposes such as alkali-free fiber glass (e.g., 55% $SiO_2$, 15% $Al_2O_3$, 22% RO (alkaline earth metal oxide) and 8% $B_2O_3$ by weight, mercury lamp glass (e.g., 56% $SiO_2$, 24% $Al_2O_3$, 15% RO and 5% $B_2O_3$ by weight) and heat resistant glass (e.g., 56% $SiO_2$, 19% $Al_2O_3$ and 25% RO by weight). However, these conventional glasses neither possess photosensitive properties nor turn opaline by thermal foaming. The possibilities of glassifying compositions within the range specified in this invention can be found in literature such as Journal of Non-Crystalline Solids, 66, 477–487(1984) and Journal of American Ceramic Society, 68, 155–158(1985), but photochemical or thermal treatment for coloration or opalization of the obtained glassess has not been reported.

DETAILED DESCRIPTION OF THE INVENTION

Figure 1:
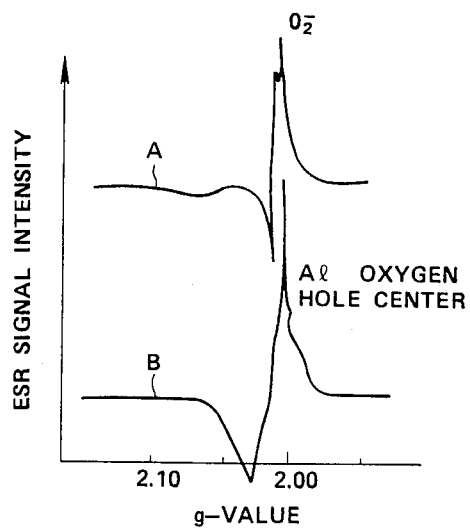
FIG. 1 is a chart showing electron spin resonance characteristics of a photosensitive glass according to the invention.

We have found that $O_2^-$ radical exists in a glass composition according to the invention in a relatively high concentration. This is evidenced by electron spin resonance (ESR) analysis as represented by the curve A in FIG. 1. Heating of the same glass to a temperature above the softening temperature results in appearance of an abundance of minute foams in the glass matrix, and analysis by gas chromatography proved that oxygen is the sole gaseous substance in the foams. Also it was proved that the total quantity of oxygen gas to which the foams are attributed is much larger than the quantity of $O_2^-$ radical measured by ESR. Therefore, it is presumable that —O—O— bond exists in the glass matrix together with $O_2^-$ radical. When this glass is irradiated with UV rays a wide absorption band having a peak at about 400 nm is induced. By the same treatment the ESR signal intensities become as represented by the curve B in FIG. 1, indicating the existence of positive holes each of which is captured on oxygen bonding directly to $Al^{3+}$ (or $Ga^{3+}$) and is called "Al oxygen hole center". From the correlativity between the intensity of the aforementioned absorption band and the ESR signal intensity we presume that the Al oxygen hole centers become color centers.

As explained above, peroxide regions are scattered in a glass according to the invention so that exposure of the glass to UV rays causes cleavage of the —O—O— bonds and results in creation of color centers. Heating of the same glass to a temperature above the softening temperature causes the peroxides to decompose and liberate oxygen gas and results in creation of minute foams which provide a milk-white appearance to the heat-treated glass.

In this invention $Al_2O_3$ and $Ga_2O_3$ can be used alternatively with almost the same effects in respect of coloration and foaming, though $Ga_2O_3$ is somewhat higher in price. If desired it is possible to use these two kinds of oxides jointly. If the amount of $Al_2O_3$ and/or $Ga_2O_3$ in the glass composition is less than 25 mol % the melt of the glass composition shows a tendency to crystallization, and difficulty arises in forming glass because of lowering of the viscosity of the melt. A tendency to crystallization augments also when the amount of $Al_2O_3$ and/or $Ga_2O_3$ is more than 70 mol %.

As to the alkaline earth metal oxide component it is possible to use any one of, and any combination of CaO, BaO, SrO and MgO on condition that the total amount of this oxide component is in the range from 30 to 75 mol %. If the amount of this component is less than 30 mol % a tendency to crystallization is considerable. If the same is more than 75 mol % difficulty arises in forming glass because of lowering of the viscosity of the melt, and a considerable tendency to crystallization is exhibited also in such a case.

In many cases glass compositions according to the invention comprise, in addition to the above described two essential components, at least one kind of glass forming oxide selected from $SiO_2$, $GeO_2$, $B_2O_3$ and $P_2O_5$. As the amount of this auxiliary component is increased the melt of the glass composition becomes higher in viscosity and lower in the tendency to crystallization so that formability of the glass is improved. However, when the amount of the auxiliary component exceeds 40 mol % of the glass composition the coloring and foaming properties of the glass become significantly inferior. In the cases of glass compositions not containing, or containing only less than 5 mol % of the auxiliary component, it is desirable to accomplish cooling of the melt in the manner of quenching since there is some tendency to crystallization.

A glass according to the invention is produced by melting a mixture of powdery raw materials. The raw materials are available in the market at relatively low prices. As is usual in the manufacture of special glasses, proper purity is required of the raw materials. Particularly when producing a photosensitive glass care should be taken to avoid intrusion of those elements which are absorbent of UV rays such as, for example, Fe and Mn. If the glass contains significant amounts of such elements it is likely that the photosensitivity of the glass is worse than expectation because absorption of UV rays by the impurity elements distributed on the glass surface constitutes obstruction to efficient permeation of the incident UV rays through the entire thickness of the glass. The raw materials are not necessarily oxides. For example, the source materials for $Al_2O_3$ and/or $Ga_2O_3$ may be either oxides or hydroxides. and the source materials for CaO, BaO. SrO and/or MgO may be oxides, carbonates or hydroxides. For $B_2O_3$ either oxide or boric acid can be used, and for $P_2O_5$ either phosphoric acid or ammonium phosphate can be used. $SiO_2$ and/or $GeO_2$ are introduced usually as oxides.

A mixture of selected raw materials is melted in a crucible or a tank furnace by electric heating. In general the melting is accomplished at about 1400°–1600° C. in about 45–90 min though the conditions are variable depending on the glass composition. A melt of good fluidity is obtained, and debubbling and homogenization are rapidly accomplished. Therefore. there is no need to add any clarifying agent to the batch mixture. The melt is spread on a suitable surface or poured into a mold and is cooled usually slowly, but rapidly if the amount of the above described auxiliary component is less than 5 mol %.

A glass according to the invention has a transition temperature of about 750°–850° C. and a softening temperature of about 850°–950° C., and the coefficient of linear expansion is about $50-80 \times 10^{-7}$/°C. That is, this glass is farily heat-resistant and possesses good resistance to thermal shocks. Therefore, the glass does not crack at the time of thermal bleaching of the glass used as a photosensitive glass or heat treatment to obtain an opaline foam glass.

The heat treatment of a glass according to the invention to obtain an opaline foam glass is carried out at a temperature above the softening temperature of the glass and below the lower critical temperature for crystallization. If the heat treatment temperature is below the softening temperature it is not possible to create oxygen bubbles in the glass. If the heat treatment temperature is unduly high, the foaming is accompanied by devitrification of the glass. The heat treatment may be accomplished during cooling of the melted glass or by reheating the completely cooled glass.

The diameters of the foams created in the glass depend on the heat treatment temperature, i.e. on the viscosity of the glass and the gas pressure in the glass. As the glass is maintained at a given temperature within the aforementioned range, the diameters of the foams gradually increase to the extent of about 100 μm in a period not longer than about 40 hr. Further extension of the heat treatment time does not result in further and appreciable enlargement of the foam diameters. The foams created in the glass are all closed cells. The foam glass has smooth surfaces because oxygen gas liberated in the glass surface layers dissipates out of the glass without leaving so-called burst bubbles. The total volume of the foams is variable depending on the heat treatment conditions and, at the maximum, becomes as large as about 10% of the entire volume of the glass. Thus, both the size of the individual foams and the total volume of the foams and, hence, the appearance of the resultant opaline foam glass can be controlled by varying the temperature and/or duration of the heat treatment.

The invention will further be illustrated by the following nonlimitative examples.

EXAMPLE 1

Commercial high purity powders of $Al(OH)_3$, $CaCO_3$ and $SiO_2$ were used as raw materials. The entire portion of each powder passed through 150-mesh sieve. These raw materials were mixed together so as to provide a glass composition consisting of 37.3% $Al_2O_3$, 53.6% CaO and 9.1% $SiO_2$ by mol. A suitable quantity of the mixture was packed in an alumina crucible and was melted by heating in an electric furnace at 1400° C. for 1 hr. The melt was spread on a refractory surface and was left to cool down to thereby obtain a homogeneous glass plate. This glass had a transition temperature of 830° C., softening temperature of 860°]C. and expansion coefficient of $75 \times 10^{-7}$/°C.

A number of test pieces in the form of thin sheet (1.5 mm in thickness) were cut out of the glass plate and divided into two groups. The both sides of each test piece were polished.

Figure 2:
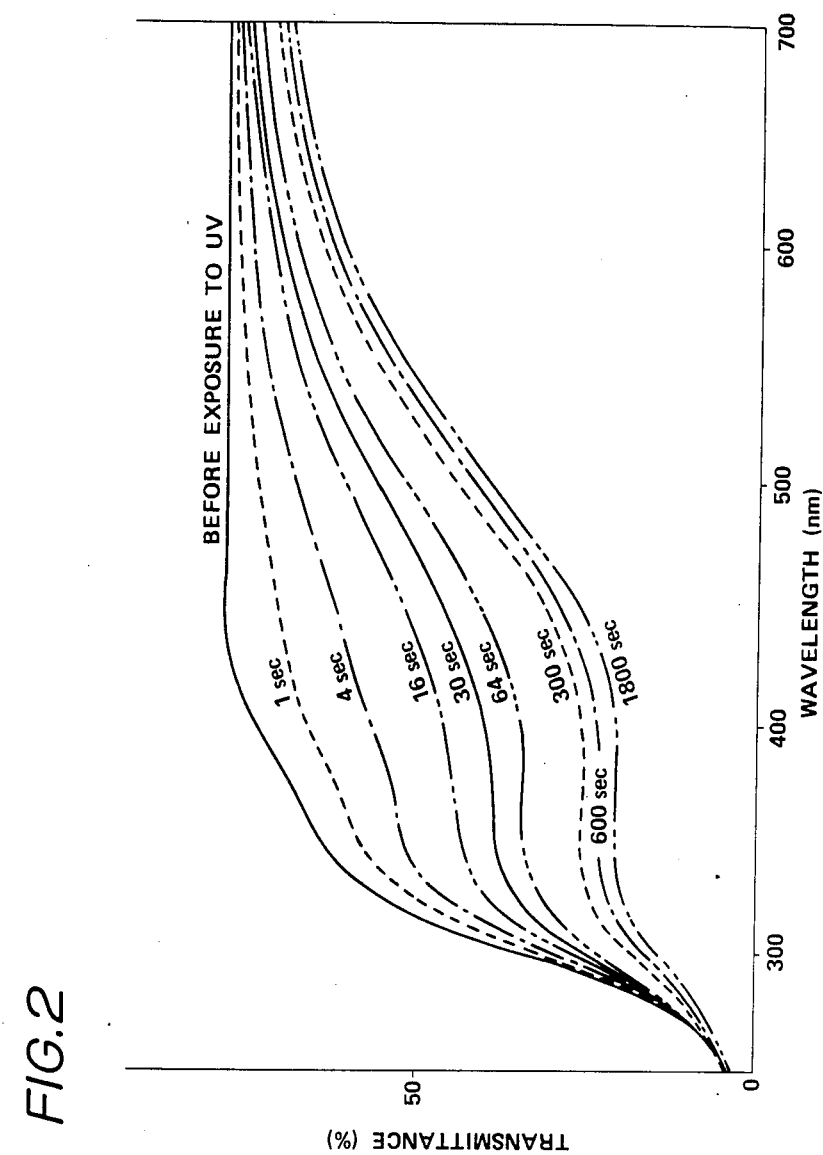
FIG. 2 is a chart showing variations in light transmittance of a photosensitive glass according to the invention with the length of time for which the glass is exposed to a UV lamp.

The first group of the test pieces were subjected to a coloring test by irradiation with ultraviolet rays. The light source was a deep UV lamp, and the energy density was constantly 0.09 J/cm². The exposure time was varied over a wide range, and spectral transmittances of the exposed test pieces were measured with a spectrophotometer. The test result is shown in FIG. 2. The exposure to the deep UV lamp caused the glass test pieces to color in yellowish brown, and the color deepened as the exposure time was extended. After terminating the exposure the glass test pieces remained colored without indication of fading.

Figure 3:
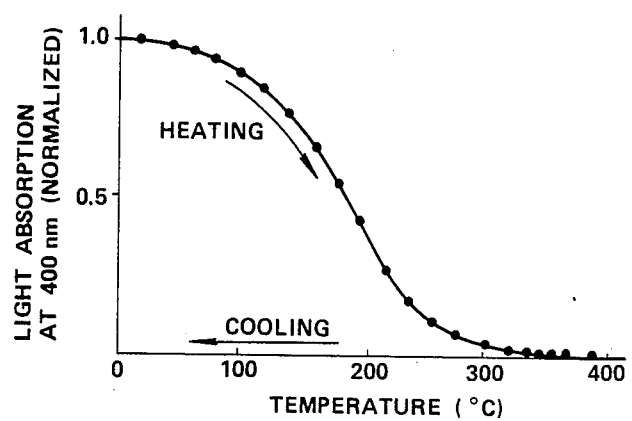
FIG. 3 is a chart showing the manner of a change in absorbancy of a photosensitive glass according to the invention during heating of the glass subsequent to coloration.

Heating of the colored glass test pieces up to about 300° C. caused complete bleaching. With respect to the test piece colored by exposure to UV rays for 30 sec, the manner of decrease in absorbancy was examined by heating the test piece at a constant rate of 10° C./min and measuring the absorbancy at various temperatures with a spectrophotometer. The result was as shown in FIG. 3, wherein the ordinate is absorbancy at the wavelength of 400 nm normalized by taking differences in optical density from the initial state before exposure to UV rays and setting the maximum value of the differences to 1.0.

After thermal bleaching, the glass test pieces could be again colored by exposure to UV rays, and the coloration and bleaching could be repeated many times with no indications of deterioration. When a mask was used for coloration of each test piece only in selected areas, the boundary between each colored area and an adjacent uncolored area was very sharp.

The second group of the glass test pieces were further divided into four sub-groups, which were placed in electric furnaces preheated to and maintained at 800° C., 860° C., 930° C. and 1000° C., respectively. Each test piece was taken out of the furnace at suitable time intervals for observation under microscope.

In the glass test pieces heated at 800° C. no foaming phenomenon was observed even though the heating was continued for 24 hr. The test pieces heated at 1000° C. soon exhibited serious devitrification. In the test pieces heated at 860° C. very fine foams appeared in about 2 hr. The diameters of the foams gradually increased while the heating was continued and reached about 20 μm in 36 hr. The heating time was further extended, but growth of the foams was no longer appreciable. In the case of heating at 930° C. the growth of foams in the glass test pieces was faster than in the case of heating at 860° C. so that the diameters of the foams reached about 100 μm in 2 hr. After that little change was observed. The foaming at 860° C. or 930° C. did not affect the surface smoothness of the glass test pieces. These test pieces assumed a milk-white color and gave the appearance of a fine-grained glass surface soft to the touch. Indeed the foamed glass test pieces appeared gorgeous and quite elegant. As demonstrated by this experiment the size of fine foams created in the heat-treated glass can easily be controlled over a fairly wide range. The heat treatment temperature needs not to be constant. For example, efficient foaming and precise control of the size of the foams can be accomplished by initially heating the glass at a relatively high temperature for a short time and thereafter maintaining the foamed glass at a lower temperature.

EXAMPLES 2-13

Commercial high purity powders of $Al_2O_3$, $Ga_2O_3$, $CaCO_3$, $BaCO_3$, $SrCO_3$, MgO, $SiO_2$, $GeO_2$, $H_3BO_3$ and $H_3PO_4$ were selectively used as raw materials. The entire portion of each powder passed through 150-mesh sieve. As Examples 2-13, twelve kinds of glass compositions shown in the following Table were employed. For every composition, melting of the batch mixture, forming of glass plate and preparation of the glass test pieces were carried out in the same manner as in Example 1. On the test pieces the photosensitiveness of each glass was examined by exposure to the deep UV lamp under the same conditions as in Example 1, and the foaming and opalizability of the same glass by visual observation after heating at a temperature adequately above the softening temperature. The results are shown in the Table.

COMPARATIVE EXAMPLES 1 AND 2

As shown in the Table, two kinds of glass compositions not in accordance with the present invention were employed for the sake of comparison. In either case glass was produced by the same method as in the foregoing examples, and test pieces of the glass were subjected to the UV-exposure test and the heat treatment test described in Example 1. The results are shown in the Table.

As can be seen in the Table, the glasses according to the invention were all good or excellent in both photosensitivity to UV rays and thermal opalizability. In contrast, the glasses of Comparative Examples 1 and 2 scarcely colored by exposure to UV rays and exhibited little change in appearance when heated at temperatures above the softening temperature of each glass.

| Glass | Glass Composition (mol %) | | | | | | | | | | Photosensitiveness | Thermal Opalizability |
|---|---|---|---|---|---|---|---|---|---|---|---|---|
| | $M_2O_3$ | | RO | | | | Glass Forming Oxides | | | | | |
| | $Al_2O_3$ | $Ga_2O_3$ | CaO | MgO | BaO | SrO | $SiO_2$ | $B_2O_3$ | $Ge_2O_3$ | $P_2O_5$ | | |
| Ex. 1 | 37.3 | | 53.6 | | | | 9.1 | | | | excellent | excellent |
| Ex. 2 | | 36.4 | 54.5 | | | | 9.1 | | | | excellent | excellent |
| Ex. 3 | 40.0 | | 60.0 | | | | | | | | excellent | good |
| Ex. 4 | 36.4 | | 54.5 | | | | | 9.1 | | | excellent | excellent |
| Ex. 5 | 30.2 | | 62.0 | | | | 7.8 | | | | excellent | excellent |
| Ex. 6 | 26.6 | | 36.1 | | | | 37.3 | | | | good | good |
| Ex. 7 | 27.0 | | 59.0 | 7.0 | | | 7.0 | | | | excellent | excellent |
| Ex. 8 | 27.0 | | | 7.0 | 59.0 | | 7.0 | | | | excellent | excellent |
| Ex. 9 | 27.0 | | | 7.0 | | 59.0 | 7.0 | | | | excellent | excellent |
| Ex. 10 | 36.4 | | 54.5 | | | | | | 9.1 | | excellent | excellent |
| Ex. 11 | 36.4 | | 54.5 | | | | | | | 9.1 | excellent | excellent |
| Ex. 12 | 20.1 | 44.0 | 30.1 | | | | 5.8 | | | | excellent | excellent |
| Ex. 13 | 25.2 | | 69.5 | | | | 5.3 | | | | excellent | excellent |
| Comp. Ex. 1 | 9.1 | | 26.1 | | | | 64.8 | | | | inappreciable | inappreciable |
| Comp. Ex. 2 | | | 59.0 | 7.0 | | | 7.0 | 27.0 | | | inappreciable | inappreciable |

What is claimed is:

1. A glass member formed of a glass composition which consists essentially of 25-70 mol % of a first component which is at least one oxide selected from the group consisting of $Al_2O_3$ and $Ga_2O_3$, 30-75 mol % of a second component which is at least one alkaline earth metal oxide selected from the group consisting of CaO, BaO, SrO and MgO and 0-40 mol % of an auxiliary component which is at least one oxide selected from the group consisting of $SiO_2$, $GeO_2$, $B_2O_5$ and $P_2O_5$, wherein said glass member is approximately a yellowish brown color in at least a selected region thereof, said color being produced by irradiating said selected region of said glass member with ultraviolet rays.

2. A glass member according to claim 1, wherein the amount of said auxiliary component is not less than 5 mol % of the glass composition.

3. An opaline foam glass, which consists essentially of 25-70 mol % of a first component which is at least one oxide selected from the group consisting of $Al_2O_3$ and $Ga_2O_3$, 30-75 mol % of a second component which is at least one alkaline earth metal oxide selected from the group consisting of CaO, BaO, SrO and MgO and 0-40 mol % of an auxiliary component is at least one oxide selected from the group consisting of $SiO_2$, $GeO_2$, $B_2O_3$ and $P_2O_5$, and which comprises minute foams created in the glass matrix by heat treatment of the glass at a temperature above the softening temperature of the glass.

4. An opaline foam glass according to claim 3, wherein the amount of said auxiliary component is not less than 5 mol % of the glass composition.

5. An opaline foam glass according to claim 3, wherein substantially all of said foams are closed cells.

6. A method of lending color to a glass member formed of a glass composition which consists essentially of 25-70 mol % of a first component which is at least one oxide selected from the group consisting of $Al_2O_3$ and $Ga_2O_3$, 30-75 mol % of a second component which is at least one alkaline earth metal oxide selected from the group consisting of CaO, BaO, SrO and MgO and 0-40 mol % of an auxiliary component which is at least one oxide selected from the group consisting of $SiO_2$, $GeO_2$, $B_2O_5$ and $P_2O_5$ and wherein the glass member may resume a colorless state by heating after coloration, the method comprising the step of irradiating at least a selected region of the glass member with ultraviolet rays.

7. A method according to claim 6, wherein the amount of said auxiliary component is not less than 5 mol % of the glass composition.

8. A method of lending color to a glass member formed of a glass composition which consists essentially of 25-70 mol % of a first component which is at least one oxide selected from the group consisting of $Al_2O_3$ and $Ga_2O_3$, 30-75 mol % of a second component which is at least one alkaline earth metal oxide selected from the group consisting of CaO, BaO, SrO and MgO and 0-40 mol % of an auxiliary component which is at least one oxide selected from the group consisting of $SiO_2$, $GeO_2$, $B_2O_5$ and $P_2O_5$ and thereafter returning the colored glass member to a colorless state, the method comprising the steps of irradiating at least a selected region of the glass member with ultraviolet rays to thereby accomplish coloration and thereafter heating the colored glass member at a temperature from about 150° C. to about 300° C. to thereby accomplish bleaching.

9. A method of producing an opaline foam glass, comprising the steps of maintaining a glass which consists essentially of 25-70 mol % of a first component which is at least one oxide selected from the group consisting of $Al_2O_3$ and $Ga_2O_3$, 30-75 mol % of a second component which is at least one alkaline earth metal oxide selected from the group consisting of CaO, BaO, SrO and MgO and 0-40 mol % of an auxiliary component which is at least one oxide selected from the group consisting of $SiO_2$, $GeO_2$, $B_2O_5$ and $P_2O_5$ at a temperature above the softening temperature of the glass and below the lower critical temperature for crystallization of the glass until minute foams of a desired size are created in the glass matrix.

10. A method according to claim 9, wherein the amount of said auxiliary component is not less than 5 mol % of the glass composition.

* * * * *